April 3, 1951 P. K. CHATTERJEA ET AL 2,546,972
TELEVISION SYNCHRONIZING SYSTEM
Filed March 14, 1946 4 Sheets-Sheet 1
FIG. 1.
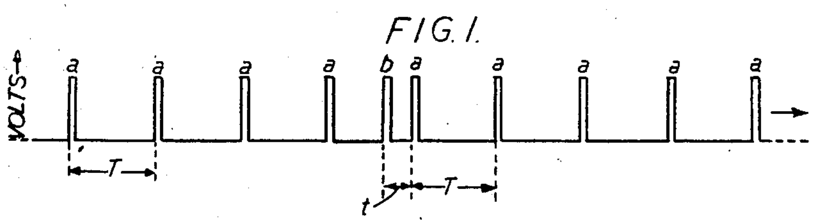
FIG. 2. FIG. 4.
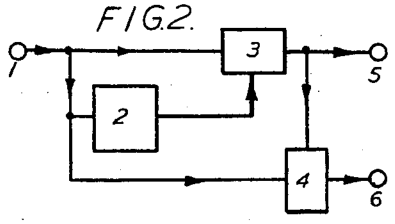
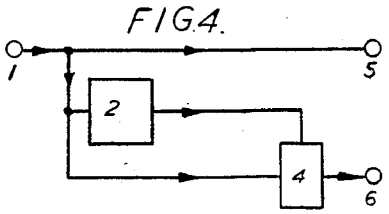
FIG. 3.
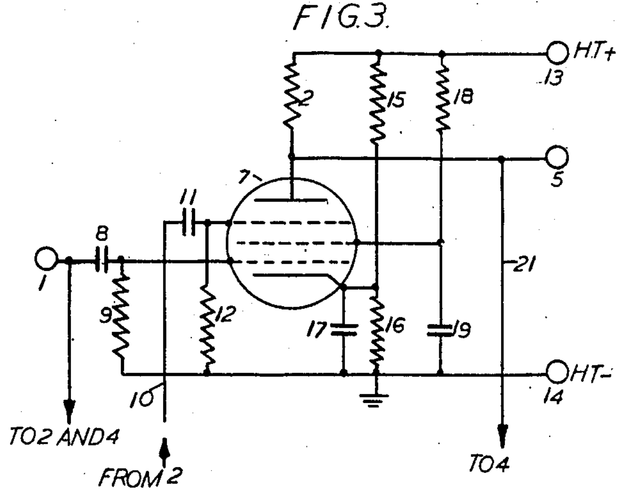
FIG. 5. FIG. 6.
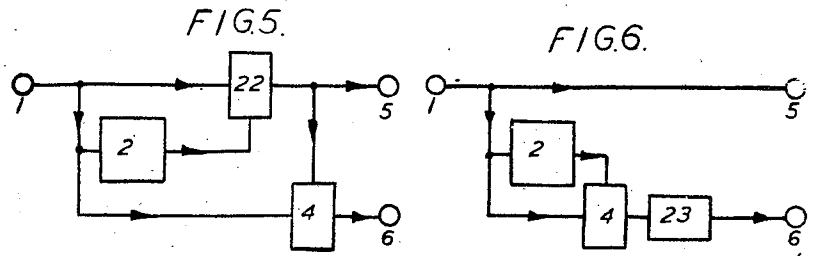
Inventors
Prafulla Kumar Chatterjea
Leslie Wilfred Houghton
by
Attorney Inventors
Prafulla Kumar Chatterjea
Leslie Wilfred Houghton
by
Attorney April 3, 1951 P. K. CHATTERJEA ET AL 2,546,972

TELEVISION SYNCHRONIZING SYSTEM

Filed March 14, 1946 4 Sheets-Sheet 3

Inventors
Prafulla Kumar Chatterjea
Leslie Wilfred Houghton
by
Edward B. ...
Attorney April 3, 1951 P. K. CHATTERJEA ET AL 2,546,972

TELEVISION SYNCHRONIZING SYSTEM

Filed March 14, 1946 4 Sheets-Sheet 4

Inventors
Prafulla Kumar Chatterjea
Leslie Wilfred Houghton
by
Edward D. Phinney
Attorney Patented Apr. 3, 1951 2,546,972

UNITED STATES PATENT OFFICE 2,546,972

TELEVISION SYNCHRONIZING SYSTEM

Prafulla Kumar Chatterjea and Leslie Wilfred Houghton, London, England, assignors, by mesne assignments, to International Standard Electric Corporation, New York, N. Y., a corporation of Delaware Application March 14, 1946, Serial No. 654,320
In Great Britain March 17, 1945

10 Claims. (Cl. 178—69.5)

The present invention relates to synchronising arrangements for electric television and like facsimile transmission systems.

In such systems it is common practice to transmit to the receiver periodic signals for the purpose of effecting synchronisation thereat, in addition to the picture signals. Such periodic signals usually have to be of two types which are separated at the receiver and used individually for line and frame synchronisation. In some well-known systems, trains of short pulses are employed and the two types are distinguished by pulse form, or by periodicity, or the like. For example, the pulses used for line synchronisation which are repeated at intervals corresponding to the intervals between consecutively scanned lines may be interrupted at regular intervals corresponding to the frame periods, and short trains of other pulses differing in form or period may be inserted and used for frame synchronising.

The systems already proposed may be divided into two broad classes, namely those in which the synchronising signals are mixed with the picture signals to form a composite signal which is transmitted over a suitable carrier wave or channel to the receiver, and those in which the synchronising signals are transmitted over a carrier wave of different frequency or over a separate channel from that which conveys the picture signals. In both classes of system the sound signals (if any) are transmitted over a channel separate from the channel which conveys the picture signals, and in the second of the above mentioned classes, the synchronising signals have sometimes been transmitted by modulating the same carrier wave as is used for conveying the sound signals.

An important feature of the present invention is the application of the technique of signal modulated pulse communication systems which has been developing in recent years, to enable the sound signals (or other signals) to be conveyed to the receiver by amplitude modulation or by time-duration modulation of the pulses which are provided primarily for synchronising the receiver. This facility has many advantages, some of which will be pointed out in due course, and in order to enable it to be employed, it is important to use a particular type of synchronising pulse train which is the principal feature of the present invention, but which has not hitherto been proposed. As will be understood from the detailed description of the invention which follows, this novel type of pulse train has advantages of its own unconnected with the facility of modulation by the sound signals, and so the invention is not confined to the use of a signal modulated pulse train for synchronisation.

The synchronising pulse train according to the invention, whether modulated or unmodulated, may be sent to the receiver separately from the picture signals, or it may be combined with the picture signals to form a composite wave in the manner of the well known recently exploited commercial television systems. If it is not desired to modulate the sound signals on to the synchronising pulses, they could carry other intelligence or control signals, and since two types of modulation are possible, they could, for example, carry control signals simultaneously with the sound signals.

It is pointed out that it has already been proposed in British Specification No. 527,310 that the synchronising pulses forming part of a combined television signal should be time duration modulated to carry control signals to the receiver, but the pulse trains described in that specification are of a different type from that characteristic of the present invention.

Having outlined the relation between the system of the present invention and the known art, the principal aims of the invention may be stated as follows:

1. To provide means whereby the proportion of transmission time required for synchronising purposes is greatly reduced.

2. To provide an improved means for picture synchronisation for either sequential or interlaced scanning in which the synchronising pulses are fed directly to appropriate time-base circuits at the receiving end.

3. To provide picture synchronising means wherein pulses of identical amplitude end duration are employed for both line and frame synchronisation, thereby effecting a reduction in the mean transmitter power as compared with systems employing longer duration pulses for frame synchronisation.

4. To provide means for the transmission of the corresponding sound signal as a modulation of the pulses employed for synchronising the picture signal.

5. To provide an improved television transmission system wherein the synchronising pulses are transmitted on a carrier wave of frequency different from that of the picture signal, thereby making a more efficient use of the peak power available at the picture signal transmitter, as compared with systems employing a composite picture and synchronising signal, especially where it is arranged that the synchronising pulses are separated by means of amplitude limiting at the receiver.

According to the invention there is provided a synchronising arrangement for an electric television or facsimile transmission system comprising means for generating a train of regularly repeated electric pulses of identical form having discontinuities introduced at specified intervals in the pulse repetition period, each discontinuity affecting not more than two consecutive periods, and means for applying the said train of pulses to a television or facsimile receiver for effecting both line and frame synchronisation thereat.

The invention will be described with reference to the accompanying drawings, in which:

Fig. 1 shows diagrammatically a train of synchronising pulses according to the invention;

Figs. 2, 4, 5, 6, 8, 10 and 12 show block schematic circuit diagrams of a number of different arrangements for separating the line and frame synchronising pulses at a television receiver, according to the invention;

Figs. 3, 7 and 13 show schematic circuit diagrams of details of Figs. 2, 6 and 12 respectively;

Figure 7:
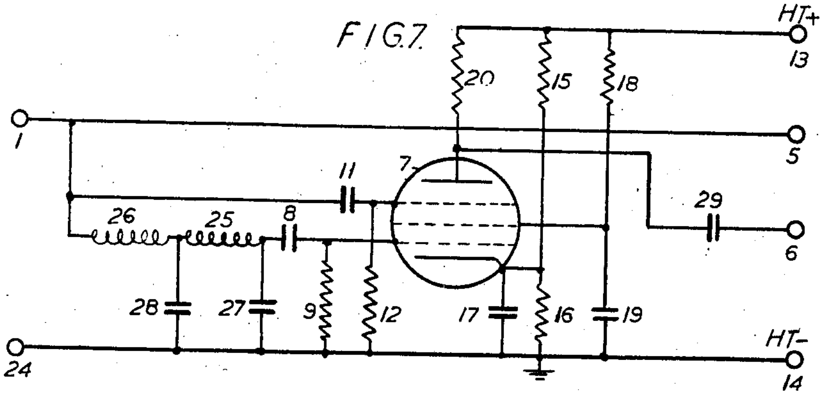

One arrangement in accordance with the invention will be understood from Figs. 1 and 2.

Fig. 1 shows the train of synchronising pulses generated at the transmitter. These pulses will be transmitted to the receiver directly over a suitable cable or circuit, or by modulating them on to a suitable carrier wave. Pulses *a* are provided for line synchronisation, and will be often, through not necessarily, one per line, and are spaced apart by a constant time interval T. Pulse *b* is an additional pulse of the same form as the others added for frame synchronisation, and timed to occur between the two appropriate line synchronising pulses. The pulse *b* occurs a short interval *t* seconds after one of the *a* pulses. This interval can have any value less than T; for example *t* could be equal to T/2. In Fig. 1, the pulses are shown as if they were travelling down the channel in the direction of the arrow.

The extra pulses *b* are inserted at intervals equal to the frame synchronising interval. An arrangement for generating this and other types of synchronising pulse trains according to the invention will be described later on with reference to Fig. 14.

Fig. 2 shows schematically an arrangement employed at the receiver for separating the line and frame synchronising pulses, which, in the form shown in Fig. 1 are fed to terminal 1, Fig. 2 and thence in parallel to the three units 2, 3 and 4, of which unit 2 is a time delay circuit adapted to delay all pulses fed to it by a time interval equal to T. Unit 3 is a circuit adapted to add together pulses obtained directly from terminal 1 and pulses delayed by the unit 2. This unit might take the form of an amplifier or like circuit so adjusted that no pulse fed to it directly from terminal 1 can pass through it except during those periods when pulses are also fed to it from unit 2. This means that after the first line synchronising pulse has arrived at terminal 1, all the line synchronising pulses are permitted to pass straight through unit 3, and thence to terminal 5. The frame synchronising pulse *b* cannot pass through the unit 3 because no corresponding delayed pulse arrives from unit 2.

Unit 4 is a pulse balancing circuit and is of such a form that the line synchronising pulses *a* fed to it from terminal 1 and those from the output of unit 3 are made to cancel out. When however, a pulse *b* arrives at terminal 1 it is not passed by unit 3 and hence is not cancelled out in unit 4 so that it appears at terminal 6 as a frame synchronising pulse without any line synchronising pulses.

The unit 3 might for example be a circuit including a multielectrode valve, as shown in Fig. 3, wherein the received pulse train is fed from terminal 1 to the control grid of a pentode valve 7 through a blocking condenser 8 associated with a grid leak resistance 9. The pulses from unit 2 are fed to the suppressor grid of valve 7 from the unit 2 over conductor 10 through a blocking condenser 11 associated with a grid leak resistance 12. In both cases positive voltage pulses would be used. The cathode of the valve 7 is biassed by means of the potentiometer connected to the high tension terminals 13 and 14, and consisting of resistances 15 and 16, with by-pass condenser 17. The cathode bias is so chosen that unless pulses arrive at the same time at the control grid and at the suppressor grid, the valve 7 will be biassed beyond the cut-off. The required screen voltage is provided by resistance 18 with by-pass condenser 19. When two pulses arrive at the same time, the drop in voltage at the anode, due to the current established in the anode resistance 20, gives a negative pulse at terminal 5. Thus the line synchronising pulses are obtained at terminal 5 free from the frame synchronising pulses. These line pulses are supplied to the unit 4 (Fig. 2) over conductor 21 connected to the anode of the valve 7.

Unit 2, Fig. 2, might be any suitable time delay network of known type, consisting for example of a ladder network of inductances and condensers, or, as an alternative, it might be one of the valve circuits described in the British specification of the copending application No. 309/45.

Unit 4, Fig. 2, could, in its simplest form, be a resistance pad. Alternatively, it could be any type of valve circuit wherein pulses are fed to a common impedance, and might be of the form already described with reference to Fig. 3 except that voltage pulses of opposite sign would be fed to the control grid and suppressor grid of the valve 7, and the cathode bias would be reduced so that if a pulse did not arrive from unit 3, Fig. 2, then a pulse would be obtained at the anode which would in this case be connected to terminal 6. An accurate balance would be obtained by means of a phasing circuit (not shown) included in the connection from terminal 1 to unit 4, Fig. 2. It will be seen that with this arrangement, positive pulses fed to terminal 1, Fig. 2, provided negative synchronising pulses at both terminals 5 and 6.

Where sequential scanning is employed, it is not essential to remove the frame synchronising pulses from the line synchronising pulses, as there is no objection to a line flyback stroke occurring concurrently with a frame flyback stroke, and therefore a somewhat simpler arrangement than Fig. 2 may be employed at the receiving end, as shown schematically in Fig. 4. Fig. 4 differs from Fig. 2 in that the unit 3 is omitted, and that the output of unit 2 is connected to unit 4 in place of the output of unit 3.

As in the case of Fig. 2, the unit 2 is a time delay circuit providing a time delay equivalent to the time interval T between line synchronising pulses, and should be arranged to provide pulses of opposite sign to those fed to it. These pulses are supplied to unit 4 in such manner as to cancel out all the line synchronising pulses fed to it from terminal 1, the frame synchronising pulses being permitted to pass through to terminal 6. The mixed line and frame synchronising pulses pass directly from terminal 1 to terminal 5.

In the two examples so far given of employing the pulse train shown in Fig. 1 for line and frame synchronising at the receiver the value of the small time interval $t$, which defines the position of the frame synchronising pulse $b$ in the interval between two $a$ pulses, is unimportant. Thus without affecting the operation of separating the two types of pulse at the receiver, the value of $t$ could be varied for the purpose of carrying out some function at the receiver. For example, if the line and frame synchronising pulses are fed after separation to a two condition flip-flop type of circuit which is adapted to be switched to the two stable conditions respectively by the two types of pulse, a train of pulses of frame synchronising frequency would be obtained, each pulse having a duration $t$. These pulses could be applied by known methods to control the mean brightness of the reproduced picture according to variations of the duration $t$ at the transmitting end.

Alternatively, however, by choosing a small value of $t$, the circuit of Fig. 2 may be slightly modified as shown in Fig. 5, to enable the delay introduced by the circuit 2 to be small compared with T.

In Fig. 5, unit 2 is the time delay circuit as before, but is arranged to delay the received pulses by the small time $t$ which might, for example, be of the order of T/10. Unit 22 replaces unit 3 of Fig. 2 and is similar to unit 4; it is adapted to cancel out any pulses which arrive there at the same instant, either direct from terminal 1 or through unit 2, the necessary phase reversal being accomplished in either unit 2 or unit 22. It will therefore be apparent that all $a$ pulses will pass straight through unit 22 to terminal 5, but that each $b$ pulse will be cancelled out by the immediately preceding $a$ pulse. Line synchronising pulses only will therefore be received at terminal 5. Unit 4 is either a subtracting or an adding circuit, depending on whether or not the $a$ pulses are inverted in their passage through the unit 22, it being arranged that cancellation of pulses from unit 22 and terminal 1 occurs in unit 4. This will then eliminate all $a$ pulses, and leave only the frame synchronising pulses $b$ to be fed to terminal 6. The input circuit of unit 4 might provide a slight phase of the received pulses to compensate for any phasing taking place in unit 22.

Yet another method of separating the pulse train of Fig. 1 is shown in Fig. 6, in which the received train is fed to the time delay unit 2 giving time delay $t$ and also to unit 4, where the pulses obtained from unit 2 are added to the original pulse train, by any type of adding circuit. Each line synchronising pulse will now be followed $t$ seconds later by a shadow pulse of equal amplitude except when a $b$ pulse occurs, in which case the amplitude of the shadow pulse will be doubled. This doubled pulse, which corresponds to the $b$ pulse, may be separated out by means of an amplitude limiting circuit unit 23 which might be in its simplest form a diode valve. In this way only frame synchronising pulses would be obtained at terminal 6. Line and frame synchronising pulses mixed would be obtained at terminal 5 direct from terminal 1 as in the case of Fig. 4.

A practical embodiment of the arrangement similar in principle to Fig. 6 is shown in Fig. 7. This comprises a pentode valve 7 arranged in the same way as in Fig. 3. The associated elements are given the same designation numbers. The synchronising pulse train, Fig. 1, is fed to terminals 1 and 24, with such polarity that terminal 1 is positive to terminal 24, and thence through the blocking condenser 11 to the suppressor grid of the valve 7, and to the control grid through a delay network of two sections consisting of series inductances 25 and 26 and shunt condensers 27 and 28, and through the blocking condenser 8. The delay network may have more than two sections if necessary, and could be arranged in other ways. The bias applied to the cathode is arranged to be such that when a positive pulse is fed either to the control grid or to the suppressor grid separately, then the valve 7 remains cut off. This will therefore be the case when line synchronising pulses only are arriving and being fed to the suppressor grid, followed after an interval $t$ by the corresponding delayed pulses arriving at the control grid. Hence no pulses appear at the anode of the valve 7. When, however, a frame synchronising pulse $b$ arrives at a time $t$ after a line synchronising pulse this will coincide with the corresponding delayed line synchronising pulse, and if the cathode bias is suitably chosen the valve will be unblocked as before, and so negative frame synchronising pulses will appear at the anode without the line synchronising pulses and will be passed through the blocking condenser 29 to the output terminal 6. The line synchronising pulses together with the frame synchronising pulses will be obtained at terminal 5 which is connected directly to terminal 1.

A more important function of the synchronising pulse train shown in Fig. 1, which involves a particular choice of the interval $t$ is that of producing an accurate reproduction at the receiver in the case where interlaced scanning is employed. By way of example a double interlaced scanning system will be described, though more than two interlacings may be dealt with in a corresponding manner.

Figure 9:
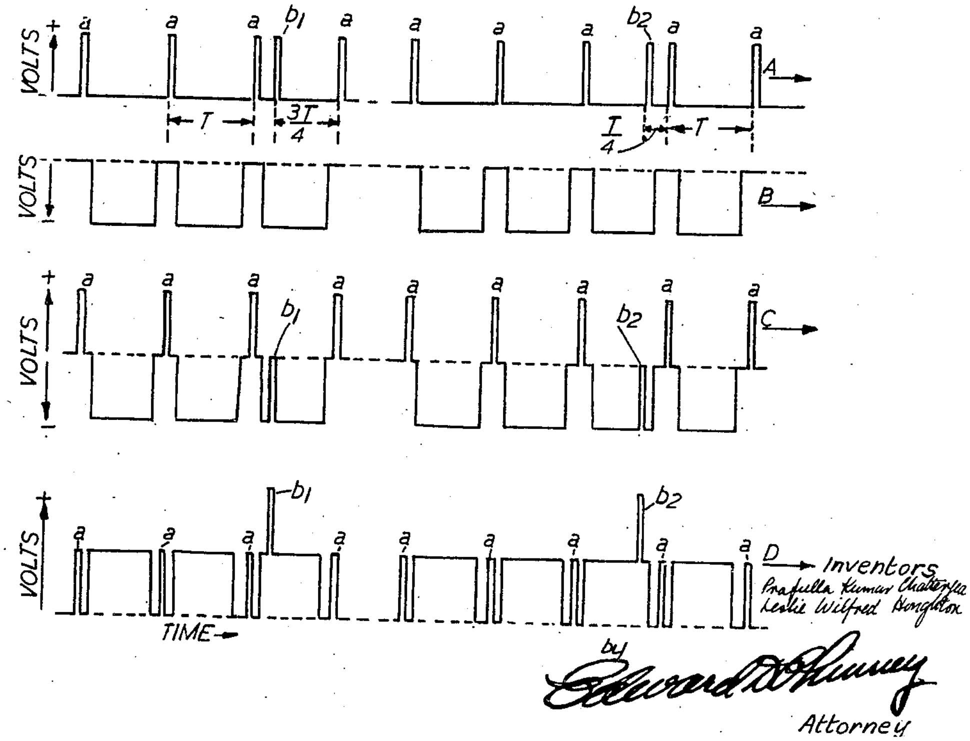
Fig. 9 shows pulse wave forms used in the explanation of the action of Fig. 8.

The condition for the frame synchronising in double interlacing is that every adjacent pair of $b$ pulses shall be separated by a time interval of $(n\pm\frac{1}{2})$ T where $n$ is an integer. This may be achieved, for example, by arranging that the value of $t$ for the $b$ pulses is alternately equal to T/4 and 3T/4. A synchronising pulse train of this kind is shown in Fig. 9 at A, in which only a few $a$ pulses in the neighbourhood of each of two consecutive frame synchronising pulses $b_1$ and $b_2$ are shown. It will be seen that the two values of $t$ indicated in Fig. 9, A, are 3T/4 and T/4 respectively.

A further condition for correct synchronisation is that the line and frame synchronising pulses be completely separated one from the other, which may readily be accomplished as explained with reference to Fig. 2. This may also readily be accomplished by the circuit shown in Fig. 5 in which the slight modification is made that unit 2 be made to provide two time delay paths both applied to unit 22 so that pulses occurring at either T/4 or 3T/4 after an *a* pulse are cancelled out.

It will be understood that with multiple interlacing, consecutive *b* pulses will be arranged to occur in more than two different positions in the interval between two consecutive *a* pulses, according to the order of the multiple interlacing. They may be separated from the line synchronizing pulses, for example, by providing more than two delay paths in the unit 22, one path corresponding to each of the possible positions of the *b* pulses.

Yet a further arrangement for separating the line and frame synchronising pulses, which is particularly applicable where the frame synchronising pulse may occur at more than one position in the interval between two consecutive line synchronising pulses, is shown diagrammatically in Fig. 8, the action of which will be explained with reference to the diagrams of Fig. 9.

Figure 8:
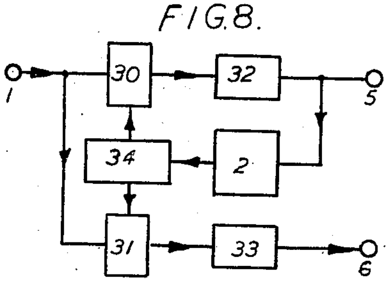

Referring to Fig. 8, the synchronising pulse train of the kind shown in Fig. 9, A, arriving at terminal 1 is applied in parallel to two adding circuits 30 and 31 which may be similar to the unit 4 of Fig. 2. Units 30 and 31 lead respectively to two amplitude limiting circuits 32 and 33 and thence to the output terminals 5 and 6 from which will be separately obtained the line and frame synchronising pulses. A pulse generator 34 supplies pulses to the adding circuits 30 and 31, being excited by line synchronising pulses obtained from the output of unit 32 after being suitably delayed in the unit 2 which is a delay circuit as before.

The pulses generated by the pulse generator 34 should be rectangular pulses of period T and duration slightly greater than the maximum interval between the two (or more) possible positons of the *b* pulses in the interval between the two corresponding *a* pulses. For example, in the particular case in which $t$=T/4 or 3T/4 then the duration of the rectangular pulses could conveniently be about 3T/4. These rectangular pulses are shown in Fig. 9, B, in negative sense, and the delay introduced by the unit 2 should be something less than T/4 so that the leading edge of each of the pulses Fig. 9, B, will occur very shortly after the occurrence of the immediately preceding *a* pulse. A generator 34 fulfilling these conditions may be provided in various known ways; for example, it may be one of the arrangements described in the co-pending specification already referred to.

The pulses shown at B, Fig. 9 are applied in negative sense as shown to the unit 30 where they are added to the pulse train arriving from terminal 1. The resulting waveform applied to the unit 32 is shown at C, Fig. 9. It will be seen that all the *a* pulses appear above the zero voltage line, but all the *b* pulses are depressed below this line. The unit 32 is therefore designed to limit somewhere above zero voltage level so that it transmits all the *a* pulses but omits the *b* pulses. Hence only the *a* pulses appear at terminal 5. It will be evident that when the pulse train is first applied at terminal 1, the first *a* pulse which gets through will produce the pulses for the generator 34 so that the elimination of the next *b* pulse is ensured. Only in the event of the first pulse happening to be a *b* pulse will this get through, the next one being removed since the *a* pulses will have been established after the loss of one *a* pulse.

The pulses from generator 34 are applied in positive sense to the unit 31. The mixed pulses will appear as shown at D, Fig. 9. It will be seen that now the *b* pulses are raised up above the general level of the pulses, but the *a* pulses are not so raised since they occur in the spaces between the rectangular pulses. The limiter 33 is therefore designed to operate at a level above the top of the *a* pulses, and this will transmit only the *b* pulses to the output terminal 6.

Figure 10:
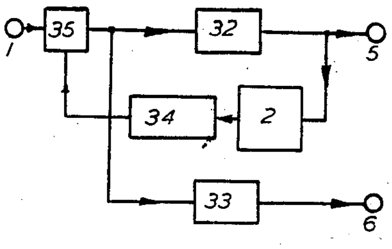

Fig. 10 shows an alternative method of dealing with the pulse train shown in Fig. 9, A. The synchronising pulse train is supplied through a device 35 to the two amplitude limiting circuits 32 and 33, which in this case are adapted to pass only positive and negative pulses, respectively. The device 35 is of the kind which transmits an applied pulse as a positive pulse or as a negative pulse according to the value of a controlling potential applied thereto. The controlling potential is derived from the pulse generator 34 (which is arranged in the same way as in Fig. 8) in the form of pulses similar to those shown in Fig. 9, B. Thus for example, the device 35 will be conditioned by the control pulses to emit a positive pulse for each *a* pulse which will be passed to terminal 5 by the limiter 32 and to emit a negative pulse for each *b* pulse which will be passed to terminal 6 by the limiter 33. The device 35 might consist of one of many types of pentode valves, which, as is well known, can be made to have one of two entirely different anode current-control grid voltage characteristics shown at E and F in Fig. 11, according to the manner in which the electrodes are polarised. In particular, the F characteristic may be obtained by placing a negative voltage on the suppressor grid. The initial bias of the control grid should be that corresponding to the point of intersection G of the two curves.

It will be seen that if the control voltage applied to the suppressor grid produces the characteristic E, then a positive pulse will cause an increase of anode current, and therefore a negative output pulse, whereas if the characteristic is F, then a positive pulse will cause a decrease of anode current and therefore a positive output pulse. Referring to Fig. 10, the pulses shown at Fig. 9, B, may be applied from the generator 34 to the suppressor grid to change the operating condition of the valve in unit 35 from characteristic E to characteristic F when an *a* pulse is due. It will therefore be seen that all line synchronising pulses will pass through the device 35 with the same polarity, but the frame synchronising pulses will have their polarity reversed, and the two sets of pulses can then readily be separated by the amplitude limiting limits 32 and 33 as already explained.

In both the last described arrangements, the pulse generator 34 could be replaced by any known circuit capable of generating two or more short duration pulses, occurring at the right times to synchronise with the arrival of all *b* pulses so that the latter can be elevated or depressed for selection by the limiter circuits. Such short duration pulses might take the form of the first two or more cycles of a damped oscillation. Alternatively, of course, delay circuits can be employed with these arrangements as previously described.

It will be appreciated that the methods explained for separating the line and frame synchronising pulses in interlaced scanning systems are also applicable to sequential scanning systems.

A variation of the synchronizing pulse train according to this invention, which however is only applicable to sequential scanning, consists in the periodic omission of a single line synchronizing pulse at intervals separated by the frame period, to effect frame synchronisation, instead of inserting extra pulses as shown in Figs. 1 or 9, A. The mechanism for interpreting this type of train of synchronising pulses can be exactly the same arrangement previously described with reference to Fig. 2. During the periods between the omitted pulses, the line synchronising *a* pulses will pass straight through unit 3, and will be cancelled out in unit 4. When, however, an *a* pulse is omitted, there will be no pulse from unit 2 (which should introduce a delay equal to T) nor will there be a pulse fed to unit 4 which will therefore continue to give no output; but when the next *a* pulse arrives, it will not be able to pass through unit 3 as there will be no delayed pulse corresponding to the previous pulse, this having been omitted. A pulse will however, be fed to unit 4, and as this will not be cancelled out, it will pass through, providing a frame synchronizing pulse at terminal 6. Thus the line synchronising pulses will arrive at terminal 5 with two consecutive pulses omitted; but the fact that the line sawtooth generator at the receiver will not have been synchronized for two periods is not a serious matter, as this short time interval can readily be covered by a picture blackout period.

Figure 11:
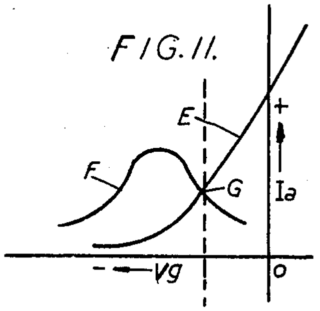
Fig. 11 shows valve characteristics used in the explanation of Figs. 10, 12 and 13.
Figure 12:
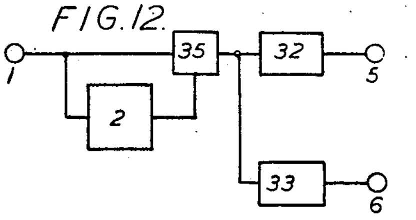

An alternative separating arrangement is shown schematically in Fig. 12, in which the units are the same as in Fig. 10, but differently arranged, except that unit 34 is not required. Unit 2 should introduce a delay equal to T. The received pulse train is fed to terminal 1 and thence to units 2 and 35. During the intervals between frame synchronising, a line synchronising pulse will always be fed to unit 35 from 2 at the same instant that the next one arrives at unit 35 from terminal 1. The pulse from unit 2 is arranged to cause unit 35 to operate on either characteristic E or F, Fig. 11 so that normally all line synchronising pulses are of the same polarity, and are passed by limiter 32 to terminal 5. Where however, a line synchronising pulse is omitted there will be no pulse passed through unit 35, but on the arrival of the next pulse, there will be no corresponding pulse arriving from unit 2, so unit 35 operates on the other characteristic, so giving a frame pulse of opposite polarity to the normal line synchronising pulse, which frame pulse will be selected by unit 33 and fed to terminal 6.

It will be apparent that by adjusting the time delay introduced by unit 2 to *t*, this arrangement can also be employed in the case of the synchronising train shown in Fig. 1 for separating a frame synchronising pulse which occurs at time *t* after a line synchronising pulse, and the arrangement could readily be adapted for separating more than one frame synchronising pulse when interlaced scanning is employed, either by using long pulses as described with reference to Fig. 10, or by using several short pulses.

Figure 13:
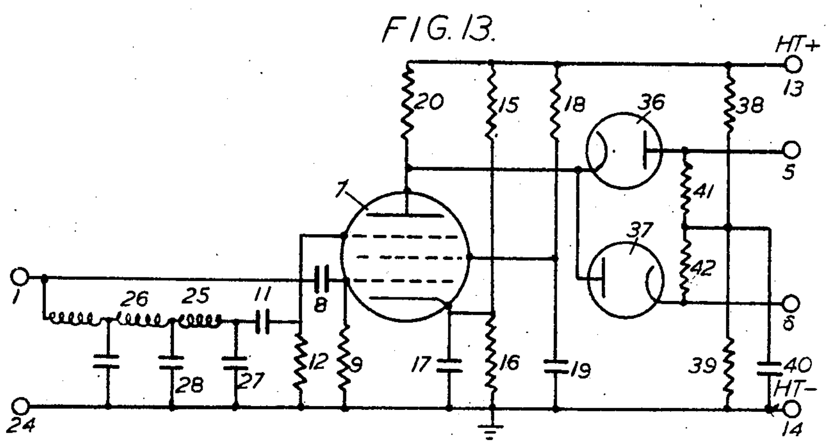

Details of an embodiment according to Fig. 12 are given in Fig. 13 wherein unit 34 comprises pentode valve 7 arranged in a similar way to Figs. 3 and 7 and with similarly designated circuit elements, except as will be pointed out. The bias of the various electrodes should be chosen to give the desired characteristic E or F (Fig. 11) as already explained. The received pulse train is fed to the control grid through the blocking condenser 8 from input terminal 1, and the suppressor grid over a delay network corresponding to unit 2, Fig. 12, and consisting of the requisite number of sections, of which three are shown, and through the blocking condenser 11. The positive or negative pulses appearing at the anode of valve 7 are supplied in parallel to two diode valves 36 and 37 which, by means of the resistances 38 and 39, with by-pass condenser 40, are so biassed that 36 only passes negative pulses and 37 only positive pulses, these being developed across the load resistances 41 and 42 respectively and fed to terminals 5 and 6 as the required separated line and frame synchronising pulses.

The cathode bias, which is determined by the resistances 15 and 16, should be adjusted so that the suppressor grid has the proper negative potential with respect to the cathode to produce the characteristic F, Fig. 11. The resistances 38 and 39 should be adjusted so that the potential of their common point is approximately equal to the anode potential under this condition. When positive pulses are applied to the suppressor grid over the delay network, which should introduce a delay equal to T, the characteristic is changed to E. Thus when the line synchronising pulses are arriving on both grids, negative output line synchronising pulses are produced at the anode of the valve 7 and are passed by the diode 36 to the output terminal 5.

When the omitted pulse fails to arrive on the suppressor grid, the characteristic F is produced for the next following pulse arriving at the control grid and a positive output frame synchronising pulse is passed through the diode 37 to the terminal 6.

It will be noted that the line and frame synchronising pulses so obtained are of opposite polarity, and either may be inverted if desired by any suitable means (not shown). By modifying the bias of the valve 7 so that the characteristic E is obtained when there are no input pulses, the circuit may be operated with negative instead of positive input pulses, and the signs of the line and frame output pulses will be reversed. It will be evident that the diodes could be replaced by dry contact rectifiers in some circumstances.

Figure 14:
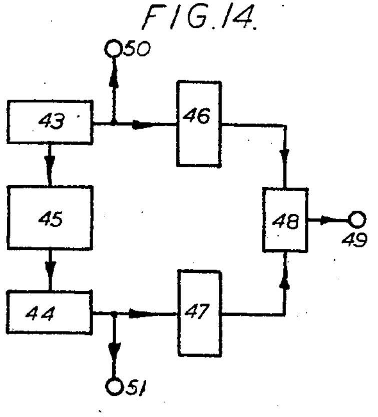
Figs. 14 and 16 show block schematic circuit diagrams of two examples of arrangements for generating the synchronising pulse trains according to the invention.

An example of an arrangement adapted for generating a synchronising pulse train according to the invention, of the type shown in Fig. 1 or 9, A, or of the type in which frame synchronising is effected by the periodic omission of a line synchronising pulse is shown in Fig. 14. Two scanning voltage generators 43 and 44 of any suitable well known type are connected by a synchronising link circuit 45. The generator 43 is adapted to generate a train of saw-tooth waves repeated at the line synchronising frequency (or at a multiple of this frequency), and the generator 44 is adapted to generate a train of saw-tooth waves repeated at the frame synchronising frequency. The link circuit 45 keeps the two frequencies locked together.

The saw-tooth waves generated by the two generators are supplied respectively to two pulse generating shaping and timing circuits 46 and 47 which are adapted to produce at their outputs trains of pulses of the desired form, which will be the same for both line and frame synchronising pulses. They also ensure that each frame synchronising pulse occurs at the proper time with respect to the adjacent line synchronising pulses: in other words, they ensure that the desired value of *t* (Fig. 1) is obtained.

The pulses obtained from the circuits 46 and 47 are combined together in an adding or subtracting network or circuit 48 and are supplied to the output terminal 49. If the frame synchronising is effected by added pulses, then the circuit 48 will be an adding circuit adapted to insert the extra frame pulses between the corresponding pair of line pulses: if, however, frame synchronising is effected by the omission of a pulse, then the circuit 48 will be a subtracting circuit adapted to cause the cancelling out of one of the line pulses.

Additional output terminals 50 and 51 may be provided for the scanning voltage generators 43 and 44 from which may be obtained, respectively the trains of line and frame saw-tooth waves for controlling the scanning of the television transmission tube or device.

It is a further important feature of the invention that the pulses employed for synchronisation may also form the sub-carrier for the transmission of the sound signals which may be a component part of the television system. This facility is of particular advantage when the synchronising signals are transmitted to the television receiver over a channel separate from that used to convey the picture signals (for example by modulating them on to a different carrier wave). It is, however, also possible to modulate the synchronising pulse train with the sound signals and then to combine the modulated pulse train with the picture signals in order to produce a composite signal intended to be transmitted over a single channel, for example by modulating a single carrier wave.

An essential requirement for such arrangements is that at the receiver, the synchronising and sound signals must be completely separated without the interaction of one on the other. According to this invention therefore it is proposed to employ either a time-duration modulation of the synchronising pulses of the type wherein only one edge of each pulse is varied by the time duration modulation and the other edge is fixed, or an amplitude modulation of the pulses wherein, of course, both leading and trailing edges are fixed. It will be appreciated that the pulse trains illustrated in Figs. 1 and 9, A represent the received pulse trains after removal of any modulation. This removal can, for example, be effected in the case of time duration modulation by a differentiation and limiting process only; and in the case of amplitude modulation, by limiting only. It is, however, not essential that in all the arrangements which have been described for separating the line and frame synchronising pulses that the modulation be removed provided that in the case of time duration modulation it is the trailing edge which is variable, and that in both cases the depth of modulation is limited to an amount dictated by design considerations and depending on whether or not the $b$ pulses are modulated. An amplitude modulation is permissible with all the arrangements described provided that the final separated synchronising pulses have sufficient amplitude for reliable synchronisation. It is to be noted that time duration modulated pulses may be separated without first removing the modulation in the arrangements of Figs. 6, 7, 10, 12 and 13, and also in the case of Fig. 8 if the depth of modulation is limited.

There are several methods by which the synchronising pulse train may be modulated by the sound signal. For example, in the case of a time-duration modulation, the pulses obtained at terminal 49 of Fig. 14 can be fed to one of the circuits described in the copending specification mentioned above adapted to produce output pulses of duration varied in accordance with the sound signal voltages. It is however, not essential that all the pulses transmitted contain sound modulation components. If, for example, the frame synchronising pulses are unmodulated, this will have no effect on the modulated line synchronising pulses, even if such unmodulated pulses are present when the pulse train is being demodulated. Hence, an alternative arrangement for duration modulation consists of applying the sound signal as a modulation to unit 46 of Fig. 14, this unit being in this case a well known pulse generator of the overload type wherein the voltage wave of sawtooth form from the scanning generator 43 is fed to an overbiassed amplifier, the sound signal being used to vary the bias voltage. When a line synchronising pulse is omitted for frame synchronisation, the unit 48, Fig. 14 could take the form of a back biassed amplifier fed by positive voltage line synchronising pulses obtained from the circuit 46. The pulses obtained from circuit 47 would then be negative, and of a duration greater than the maximum duration of the modulated line pulses, in order to ensure complete elimination of these pulses.

In the case when the synchronising signals are transmitted to the receiver separately from the picture signals, the maximum permissible depth of time-duration modulation that can be employed is such that no pulse can interfere with an adjacent pulse. When frame synchronising is by means of an added pulse, this limiting factor will be determined by the value of $t$ chosen in the case of Fig. 1 or 9, A. So far, no mention has been made about blackout periods, which would be part of the picture signal, and are governed mainly by permissible flyback times of the scanning waveforms. Hence, if an increase in the permissible depth of time duration modulation is required, this can be effected by removing the line synchronising pulse which would interfere with a frame synchronising pulse, this removal being covered by the picture blackout period. If the trailing edges of the line synchronising pulses are moved by the modulation, then the line pulse which occurs immediately before the frame synchronising pulse should be removed. This would restrict the separating arrangements available for use to those described with reference to Figs. 4, 12 and 13, while Figs. 8 and 10 could be used provided that the unit 34 were a free scanning generator synchronised by the pulses coming from the unit 2. Probably the simplest procedure in the case where the depth of modulation is such as to cause interference between the frame pulse and the adjacent line pulse is to remove the modulation from the interfering line pulse.

By these expedients, practically the whole of the interval between two line synchronising pulses may be taken up for the duration modulation.

The amplitude modulation of the pulses obtained at terminal 49, Fig. 14, by the sound signal, can readily be obtained by passing them through an amplifier, the gain of which is controlled by the sound signal, for example, by applying the sound signal to vary the bias voltage of a valve in the amplifier having a variable mutual conductance. At the receiver it may not be necessary to remove this amplitude modulation from the pulses prior to synchronisation, but constant amplitude pulses can readily be obtained by limiting, if desired.

Demodulation of the received pulse train in order to receive the sound signals may be done according to known technique, such as by the use of a low pass filter, to which the received signal can be fed direct. It will be appreciated that two separate series of signals may be carried by the synchronising pulses by the simultaneous use of amplitude modulation and time-duration modulation, for example auxiliary control signals for either the picture or sound may be transmitted on the pulses to the receiver simultaneously with the sound signals.

Figures 15, 17:
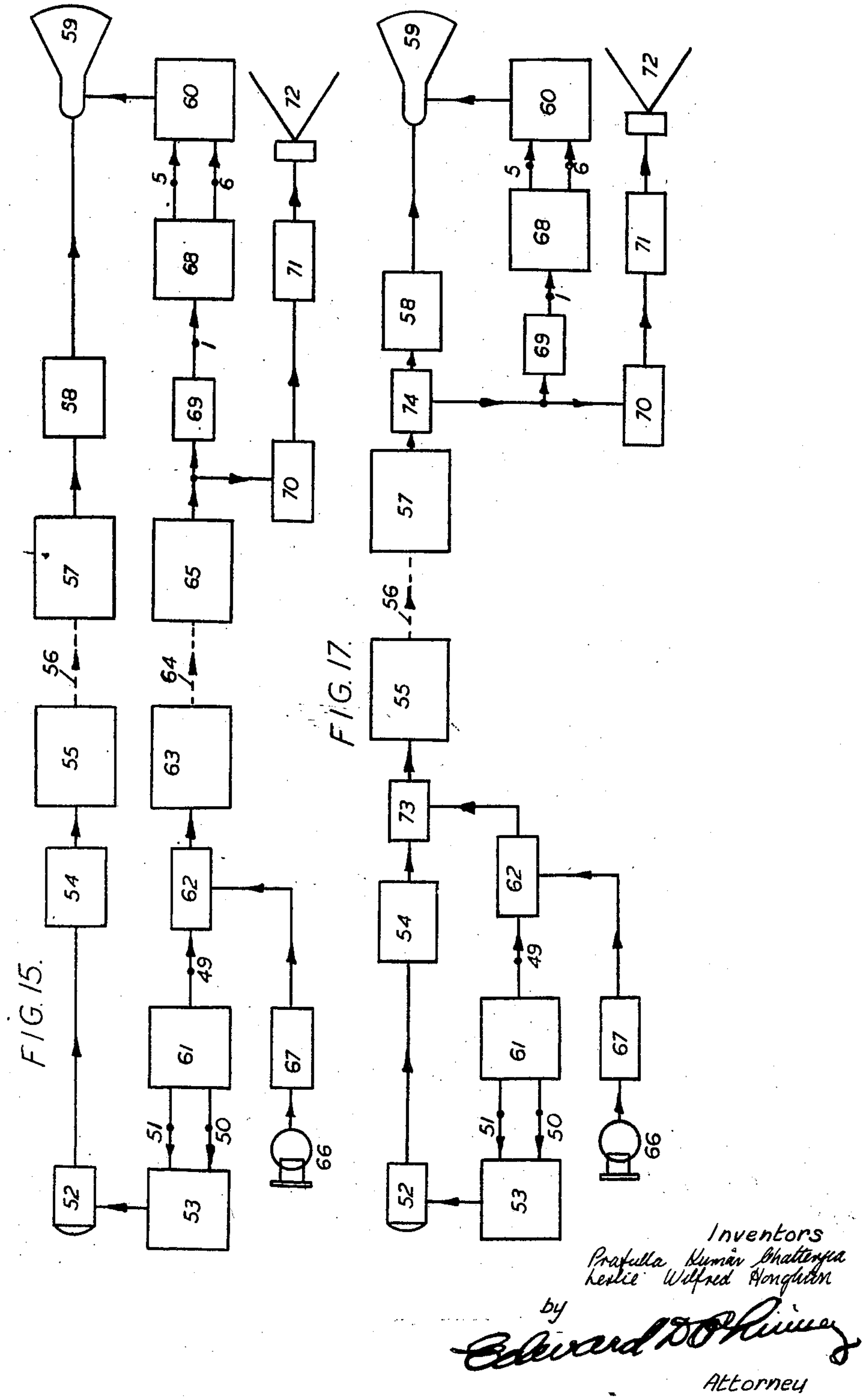
Figs. 15 and 17 show block schematic diagrams of two television systems according to the invention.

Fig. 15 shows a block schematic diagram of one example of a complete television system which incorporates features of the invention and in which the synchronising pulses are transmitted over a channel separate from that used for the picture signals. At the transmitting end the picture recording device or camera tube is shown at 52 and is connected to a scanning control circuit 53 and also to a picture signal generator 54 in which the response of the device 52 is converted into the usual varying picture signal currents. The output of the generator 54 is applied to a transmitter 55 which transmits the picture signals over a channel represented by the dotted line 56 to a corresponding receiver 57. Thus, for example, the transmitter 55 may be a radio transmitter modulated by the signals obtained from the generator 54, and 57 may be a corresponding radio receiver, the channel 56 being represented by the path between the two corresponding antennas (not shown). The demodulated signals obtained from the output of the receiver 57 are applied to a circuit 58 for modulating the reproducing cathode ray tube 59, the cathode beam of which is controlled by the scanning control circuit 60.

The synchronising pulses for the system are generated by the pulse generator 61, one form of which may be that described with reference to Fig. 14. The separate trains of line and frame synchronising waves for synchronising the scanning of the picture recording device 52 are supplied from the output terminals 50 and 51 to the scanning control circuit 53. The synchronising pulse train according to the invention which, as already explained, is obtained from terminal 49, may be applied through a modulating circuit 62 to a second transmitter 63 and thence over a channel 64, which is different from the channel 56, to a second receiver 65. The second channel may be a radio channel operating on a different carrier frequency from that used for the channel 56. It will be understood that the synchronising pulse train may be any of the types according to the invention described with reference to Fig. 1 or 9, A.

Sound signals from a microphone 66 may be applied through an amplifier 67 to the modulator 62, which may be one of the kinds already mentioned adapted for time-duration or amplitude modulating the the train of synchronising pulses derived from terminal 49 of the pulse generator 61. The modulated synchronising pulses obtained from the output of the receiver 65 are applied to terminal 1 of a separating circuit 68 which may be any of the types described with reference to any of the Figs. 2 to 8. 10, 12 or 13 of the accompanying drawings. If necesary, a circuit 69 may be interposed between the radio receiver 65 and the separating circuit 68, for removing the modulation from the synchronising pulses. It has however already been stated that it is not always necesary to remove this modulation. The trains of line and frame synchronising pulses obtained respectively at terminals 5 and 6 of the separating circuit 68 are applied to the synchronising control circuit 60 for synchronising the scanning of the cathode ray tube 59 according to known practice.

The modulated pulse train at the output of the receiver 65 may also be applied to a demodulator 70 for recovering the sound signals, which after amplification in the amplifier 71 are applied in the usual way to a loud speaker 72. In practice, the elements 53, 54 and 61 are often combined in a single unit, as are also the units 58, 60 and 68.

It has already been stated that it is not essential according to the invention to convey any signals to the receiver by modulation of the synchronising pulse train; thus the elements 62, 66, 67, 69, 70, 71 and 72 may be omitted, terminal 49 being connected directly to the transmitter 63 and terminal 1 directly to the receiver 65.

No details have been given of any of the elements other than 61 and 68 since all of them may be of any suitable conventional types. It will be understood that the channels 56 and 64 are not necessarily radio channels: they may be carrier circuits over cable or open wire, or the signals could be directly transmitted over wire conductors connecting the elements 54 and 58, and the elements 62 and 69, the transmitters and receivers 55, 57, 63 and 65 being perhaps not required. Intermediate repeaters (not shown) could, of course, be used if necessary.

It is well known that the permissible range of the frequency band which may be used to modulate a pulse train is directly related to the recurrence frequency of the pulse train. So far it has been assumed that the synchronising pulse train has the periodicity normally required by the line synchronisation, but according to another feature of the invention, means is provided whereby a wider sound modulation frequency band can be transmitted than that normally allowable by the line synchronising pulses.

Figure 16:
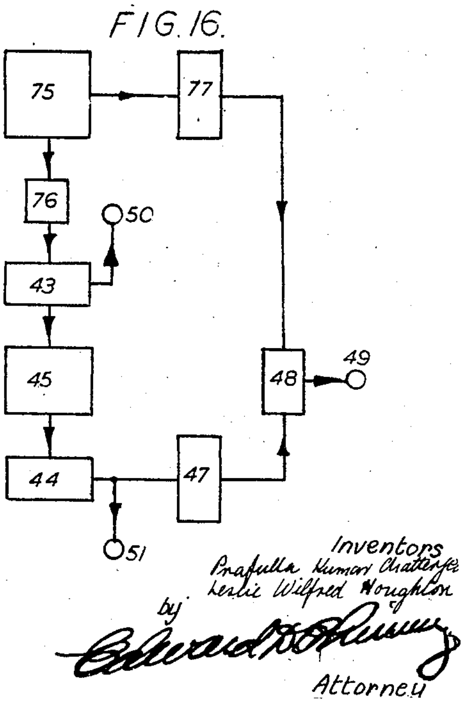

An example of an arrangement by which this may be done is shown in Fig. 16, which is a modification of Fig. 14. In Fig. 16, the master oscillator which controls the whole of the synchronisation of the system is shown at 75. This is arranged to oscillate at a multiple of the line scanning frequency, for example four times. The master oscillator 75 controls the scanning voltage generator 43 through a frequency divider 76 designed to divide the frequency down to the line scanning frequency, for example by the factor four. The master oscillator controls the pulse generator 77 directly. This pulse generator is similar to 46 of Fig. 14 but is designed to produce the synchronising pulses at the multiple frequency. Fig. 16 is otherwise the same as Fig. 14, and the outputs of the pulse generators 77 and 47 are mixed in the unit 48 as before, the synchronising pulse train being obtained at terminal 49 for transmission to the receiver as previously explained.

Fig. 17 shows an example of the arrangement of a television system in which the synchronising pulse train of any of the types according to the invention is mixed with the picture signals to form a composite signal of the conventional type transmitted over a single channel to the receiver. These elements which may be the same as corresponding elements in Fig. 15 have been given the same designation numbers and will not be further described. It will be noted that the elements 63, 64 and 65 are now omitted, and two new elements 73 and 74 are added.

When the synchronising pulse train is modulated by the sound signals, the output of the modulator 62 is connected to a mixing device 73 interposed between the elements 54 and 55. This device is arranged to insert the modulated synchronising pulses in the corresponding blanked out intervals of the picture signals, according to the usual practice. At the receiving end, a corresponding limiting device 74 separates the synchronising pulses from the combined signal and passes them to the elements 69 and 70, the picture signals being passed to the element 58. Demodulation and synchronisation then takes place as described with reference to Fig. 15. As in the case of Fig. 15, also, the element 69 may not be necessary and can be omitted.

It will be evident that with the arrangement of Fig. 17 where the synchronising pulses are mixed with the picture signals, it is not possible to multiply up the line synchronising pulses since the additional pulses would interfere with the picture signals. It is preferable, therefore, to employ the arrangement of Fig. 15 when transmitting the sound signals by modulation of the synchronising pulses. It will be understood that as in the case of Fig. 15, the elements 62, 66, 67, 69, 70, 71 and 72 may be omitted from Fig. 17 if it is not desired to modulate the synchronising pulses with the sound signals.

It should be noted that if in the case of Fig. 16 time-duration modulation of the pulses is employed, the depth of modulation must evidently be suitably limited to avoid encroachment on the reproduced picture. As indicated in Specification No. 527,310 referred to above, the modulation should preferably be such that the pulse duration never exceeds about 0.15 of the line synchronising period. This limitation does not apply when the synchronising pulses are transmitted over a channel separate from that used for the picture signals.

While in television systems it will often be desirable to modulate the synchronising pulses with the sound signals, yet it will be evident from what has been said that this is not essential according to the invention, which is also applicable to such systems as facsimile transmission systems not accompanied by sound signals. It will be obvious also that the pulses may be made to carry other signals such as control signals instead of the sound signals, and as already pointed out, they can carry simultaneously two separate series of signals. It is not however, essential according to the invention that they should carry any signals at all.

It will be noted that in any of the types of synchronising pulse trains according to the invention which have been described, three methods of frame synchronising have been employed, namely:

(1) By the periodic addition of an extra pulse to the line synchronising pulses.

(2) By the periodic removal of a line pulse.

(3) By addition of an extra pulse and removal of an adjacent line pulse. Looked at another way, this is equivalent to shifting the position of one of the line pulses.

It will be seen that the effect of each of these three methods is to introduce periodically a discontinuous change in spacing of the line synchronising pulses affecting not more than two consecutive periods of the pulses.

What is claimed is:

1. A synchronizing arrangement for an electric television transmission system wherein video, line and frame synchronizing signals are transmitted to the receiver comprising means for generating a train of regularly repeated line synchronizing pulses all of identical form, means at said transmitter for periodically modifying said train of pulses at intervals equal to the frame period by inserting a pulse of identical form and equal amplitude and by removing an adjacent line pulse thereby effectively advancing one of said pulses with respect to its normal time of occurrence for effecting frame synchronization, means for transmitting the modified train of synchronizing pulses to said receiver and means at said receiver responsive to said modified synchronizing pulse train to separate said line synchronizing pulses and said inserted pulse for effecting both line and frame synchronization.

2. The synchronizing arrangement as claimed in claim 1 wherein said responsive means at the receiver comprises, means for delaying said modified synchronizing pulse train for a duration equal to a period of said line synchronizing pulse train, an electron discharge device, means for applying said modified pulse train and said delayed pulse train simultaneously to said discharge device, said discharge device being responsive to pulses applied simultaneously from said modified pulse train and said delayed pulse train to generate a pulse of a first polarity and responsive to each pulse of said modified pulse train applied thereto in the absence of a pulse from said delayed pulse train to generate a pulse of a second polarity, two amplitude limiters responsive respectively to pulses of said first and second polarity, means for applying said pulses from said discharge device to said limiters to segregate said first and second polarized pulses and means for separately applying said segregated pulses to said receiver to effect line and frame synchronization respectively.

3. The synchronizing arrangement as claimed in claim 2 wherein said electron discharge device comprises an amplifying valve having a plurality of electrodes including at least two control grids, a cathode and an anode, means for polarizing said electrodes of said valve to re-transmit an applied pulse of a given polarity as a pulse of the same or opposite polarity in accordance with the particular control grid to which said pulse is applied, and means for applying said modified pulse train to one grid of said valve and said delayed pulse train to a second grid of said valve.

4. A synchronizing arrangement for an electric television transmission system adapted for double interlaced scanning wherein video, line and frame synchronizing signals are transmitted to the receiver comprising, means for generating a train of regularly repeated line synchronizing electric pulses all of identical form, means for inserting an extra pulse of identical form and equal amplitude to said generated pulses alternately into said pulse train substantially a quarter of a line period before a line pulse and substantially a quarter of a period after a line pulse, means for transmitting the modified train of synchronizing pulses to said receiver and means at said receiver responsive to said modified synchronizing pulse train to separate said line synchronizing pulses and said inserted extra pulses for effecting both line and frame synchronization respectively.

5. An arrangement according to claim 4 in which the responsive means at the receiver comprises means controlled by the line synchronising pulses for generating a train of rectangular pulses of duration slightly less than the period of the said line synchronising pulses, means for combining the train of rectangular pulses in opposite sense with the synchronising pulses to depress the tops of the extra pulses below the level of the tops of the remaining pulses, a first amplitude limiter operative to respond only to the remaining pulses and to transmit them for line synchronisation at the receiver, means for combining the train of rectangular pulses in the same sense with the synchronising pulses to raise the tops of the extra pulses above the tops of the remaining pulses, and a second amplitude limiter operative to respond only to the extra pulses and to transmit them for frame synchronisation at the receiver.

6. An arrangement according to claim 4 in which the responsive means at the receiver comprises means controlled by the line synchronising pulses for generating a train of rectangular voltage pulses of duration slightly less than the period of the said line synchronising pulses, a pulse transmitting device controlled by the said rectangular voltage pulses and adapted to produce output pulses of the same or opposite sense as the input pulses according to the value of a control voltage applied thereto, means for applying the synchronising pulse train to the said device, and first and second amplitude limiters connected to the output of the said device and operative respectively to transmit pulses of opposite sign for line and frame synchronising respectively, at the receiver, whereby only the extra pulses are eliminated by the first limiter, and only the extra pulses are transmitted by the second limiter.

7. A synchronizing arrangement for an electric television transmission system wherein video, line and phase synchronizing signals are transmitted to the receiver, comprising means for generating a train of regularly repeated line synchronizing electric pulses, all of identical form, means at said transmitter for generating additional pulses of identical form and equal in amplitude to the pulses of said generated train, means at said transmitter for periodically modifying said generated pulse train at intervals equal to a frame period by inserting said additional pulses and thereby introducing discontinuous changes in the pulse repetition period of said generated pulse train, each such discontinuity affecting not more than two consecutive periods, means for transmitting the modified train of synchronizing pulses to said receiver, and means at said receiver responsive to said modified synchronizing pulse train operative to separate said line synchronizing pulses from said additional pulses for effecting line and frame synchronization respectively.

8. An arrangement according to claim 7 in which the responsive means at the receiver comprises means for delaying the synchronising pulse train by a whole period of the line pulses, means for combining the original and delayed pulse trains to increase the amplitude of the pulses except when a pulse is missing from either train, amplitude limiting means for transmitting only the pulses of increased amplitude for effecting line synchronisation at the receiver, and means for combining the pulses of increased amplitude with the original pulse train in sign opposition to produce single pulses repeated at the frame synchronising frequency, and means for applying the said single pulses to the receiver for effecting frame synchronisation.

9. An arrangement according to claim 7 in which the responsive means at the receiver comprises means for delaying the synchronising pulse train by a period equal to the time interval between each extra pulse and the immediately preceding line pulse, means for mixing the original and delayed train to cancel out all the extra pulses, means for combining the original and mixed trains to cancel out all except the extra pulses and means for applying the mixed and combined trains to the receiver for effecting line and frame synchronisation respectively.

10. An arrangement according to claim 7 in which the responsive means at the receiver comprises means for delaying the synchronising pulse train by a period equal to the time interval between each extra pulse and the immediately preceding line pulse, means for combining the delayed pulse train with the original train to obtain a pulse of increased amplitude corresponding to each extra pulse, amplitude limiting means for transmitting only the pulses of increased amplitude to the receiver for the purpose of effecting frame synchronisation, and means for applying the original pulse train thereto for effecting line synchronisation.

PRAFULLA KUMAR CHATTERJEA.
LESLIE WILFRED HOUGHTON.

REFERENCES CITED

The following references are of record in the file of this patent:

UNITED STATES PATENTS

| Number | Name | Date |
|---|---|---|
| Re. 22,390 | Lewis | Nov. 9, 1943 |
| 2,152,234 | Ballard | Mar. 28, 1939 |
| 2,175,033 | Schlesinger | Oct. 30, 1939 |
| 2,200,009 | Nuttall | May 7, 1940 |
| 2,203,528 | Harnett | June 4, 1940 |
| 2,227,108 | Roosenstein | Dec. 31, 1940 |
| 2,231,829 | Lewis | Feb. 11, 1941 |
| 2,237,640 | Urtel | Apr. 8, 1941 |
| 2,251,966 | Wheeler | Aug. 12, 1941 |
| 2,266,154 | Blumlein | Dec. 16, 1941 |
| 2,269,524 | Edwards | Jan. 13, 1942 |
| 2,284,714 | Bedford | June 2, 1942 |
| 2,391,776 | Fredendall | Dec. 25, 1945 |
| 2,401,384 | Young | June 4, 1946 |

FOREIGN PATENTS

| Number | Country | Date |
|---|---|---|
| 431,458 | Great Britain | May 4, 1935 |
| 446,354 | Great Britain | Apr. 29, 1936 |
| 431,339 | Great Britain | July 3, 1935 |
| 474,776 | Great Britain | Nov. 8, 1937 |
| 699,196 | Germany | Nov. 25, 1940 |